United States Patent
Glassner

(10) Patent No.: US 10,794,458 B2
(45) Date of Patent: Oct. 6, 2020

(54) CONTINUOUSLY VARIABLE POWER SPLIT TRANSMISSION

(71) Applicants: Rudolf Glassner, Steyr (AT); VDS—Holding GmbH, Wolfern (AT)

(72) Inventor: Rudolf Glassner, Steyr (AT)

(73) Assignees: Rudolf Glassner, Steyr (AT); VDS—HOLDING GMBH, Wolfern (AT)

( * ) Notice: Subject to any disclaimer, the term of this patent is extended or adjusted under 35 U.S.C. 154(b) by 17 days.

(21) Appl. No.: 16/355,911

(22) Filed: Mar. 18, 2019

(65) Prior Publication Data
US 2019/0285154 A1 Sep. 19, 2019

(30) Foreign Application Priority Data
Mar. 19, 2018 (EP) .................... 18000267

(51) Int. Cl.
*F16H 37/08* (2006.01)
*F16H 47/04* (2006.01)
*F16H 3/62* (2006.01)

(52) U.S. Cl.
CPC ............ *F16H 37/084* (2013.01); *F16H 3/62* (2013.01); *F16H 47/04* (2013.01); *F16H 2037/0873* (2013.01); *F16H 2200/0043* (2013.01); *F16H 2200/2007* (2013.01); *F16H 2200/2041* (2013.01)

(58) Field of Classification Search
None
See application file for complete search history.

(56) References Cited

U.S. PATENT DOCUMENTS

| 4,856,371 | A  | * | 8/1989  | Kemper  | F16H 15/50 475/215 |
| 7,322,901 | B2 | * | 1/2008  | Miller  | F16H 15/28 475/189 |
| 9,488,263 | B2 |   | 11/2016 | Vasudeva et al. | |
| 2009/0017960 | A1 | * | 1/2009 | Triller | F16H 37/084 475/214 |
| 2015/0330491 | A1 | * | 11/2015 | Matsumura | F16H 3/093 475/149 |
| 2015/0345629 | A1 | * | 12/2015 | Liu | F16H 37/084 475/302 |

FOREIGN PATENT DOCUMENTS

DE 3533193 A1 5/1987

* cited by examiner

*Primary Examiner* — Colby M Hansen
(74) *Attorney, Agent, or Firm* — Bachman & LaPointe, PC; George Coury

(57) ABSTRACT

A continuously variable power split transmission for a combustion engine (VM), powering vehicles includes a variator (V) and a summing gear train (SG1), the variator transmits a fraction of the power with a continuously variable speed to the summing gear train (SG1) which includes four shafts, a first sun gear (S1), a second sun gear (S2), a ring gear (H1) and a number of planetary gears (P1, P2) journaled on a planet carrier (St1), wherein: The couplings (C0, C1; C0, C1, B0, B1) are incorporated in one common entry unit (E). The summing gear has first (P1) and the second planetary gears (P2) on a common planet carrier (St1), meshing with each other; the first sun gear (S1) or the first ring gear (H1) are driven in turn to create ranges; and the planet carrier (St1) of the summing gear train (SG1) is drivingly connected with the output shaft (StW1) of the transmission.

15 Claims, 4 Drawing Sheets

|    | B0 | B1 | C0 | C1 |
|----|----|----|----|----|
| F1 |    | X  |    |    |
| F2 |    |    | X  |    |
| F3 | X  |    |    | X  |
| F4 | X  |    |    |    |

Fig. 4

CONTINUOUSLY VARIABLE POWER SPLIT TRANSMISSION

The invention relates to a continuously variable power split transmission for powering vehicles and/or work machines by a combustion engine, comprising a variator, a summing gear train and a number of couplings, the variator delivering a fraction of the power of the combustion engine with a speed that is continuously variably controlled between maximum speeds in both directions to the summing gear train, where it is superposed to the other fraction of the power, and where transition between a plurality of ranges occurs in points of synchronism, the summing gear train being a planetary gear train with four shafts comprising a sun wheel as first central wheel, a second central wheel, a ring gear and a number of planetary gears held on a planet carrier.

The Patent publication DE 35 33 193 relates to such a power split transmission. The variator as well as the summing gear train are coaxial with the output shaft of the combustion engine. The variator being coaxial with the input, a hollow shaft is required. The summing gear train is of the planetary type with two ring gears and communicates with the couplings on the final output side via two further hollow shafts, one inside the other. The summing gear train and the hollow shafts are very expensive, particularly the wide outer one of the two nested hollow shafts. The disposition of the couplings on the exit side is very disadvantageous, as they must be dimensioned for the whole exit torque and therefore are very bulky. The transmission has only three ranges whereof one range is purely hydrostatic and two ranges are power-split.

A further power split transmission is described in the publication U.S. Pat. No. 9,488,263. It comprises two planetary gear train modules, namely a differential module on the entry side and a range module on the exit side, and a variator. Some couplings are interposed between the modules and one is disposed behind the range module. In this transmission the couplings are very bulky, too, as they must be dimensioned for the sum of the mechanically transmitted and the superposed hydrostatic torques. The adduction of control fluid to the couplings is tricky because some couplings are located between the modules and a further coupling on the exit side. Altogether, a higher number of couplings in relation to the number of ranges is required.

At last, a power split transmission with a hydrostatic or electric variator is described in the publication EP 2258966 B. Its summing gear train comprises two complete planetary gear trains (sun wheel, ring gear and planets on a planet carrier), whose sun wheels are located on a common shaft, thus rigidly coupled to each other. Likewise rigidly coupled are the planet carriers of both planetary gear trains. The mechanical power path comprises a number of sets of spur gears. Therefore an embodiment with coaxial entry and exit shafts is impossible and the whole transmission is very large. A further disadvantage is that the transition to the highest range does not occur in a point of synchronism.

SUMMARY OF THE INVENTION

The problem the invention sets out to solve, is to create a transmission of this kind that avoids all the mentioned disadvantages. It must be simpler in design with less and cheaper components and less bulky, and yet it must have a higher functionality. This is achieved by the characteristic features of the independent claims and also as disclosed herein.

All the couplings and brakes incorporated in the entry unit are dimensioned for the entry torque (which is lower than the output torque), upstream of the final reduction and only for the mechanically transmitted fraction of the torque. Therefore the whole transmission is less bulky and the adduction of oil for operating the couplings is simpler.

The summing gear train with four shafts comprises only one planetary gear train, unlike the state of the art. One geared element (the central gear, either a sun gear or a ring gear) is omitted. This results in a simpler, shorter and cheaper design of the whole transmission and permits the input shaft and the output shaft of the whole transmission to be coaxial. And yet only one hollow shaft is required.

The mechanical power path leads, depending on the range, either through the first sun gear or the first ring gear. The path from the variator leads in every range over a second central gear which is either the second sun gear or the second ring gear. This results in more flexibility design wise. The exit drive is via the planet carrier.

The flexibility is the result of the two possible embodiments of the summing gear train, without any modification to the entry unit. In the first embodiment the second central gear is a sun gear and the power output is either by way of a hollow shaft or by way of a planet carrier provided with an exit shaft or an exit gear. In the second embodiment the second central gear is a ring gear and the exit drive is via a plain (not hollow) shaft. This latter embodiment is particularly suitable for straight-through drive. This means that the input shaft and the output shaft of the transmission are concentric.

The variator can be hydrostatic or motor-electric or otherwise and located wherever suitable for the particular application, and drivingly connected with the second central gear which is either the sun gear or the ring gear of the summing gear train.

In an advantageous development, the first ring gear and the first sun gear of the summing gear train are located adjacent the entry unit and the planet carrier and the second central wheel are located at the opposite side, and sets of first planet gears and second planet gears meshing with each other are journaled on the planet carrier. This type of planet gear train is known as Ravigneaux—train. In the first embodiment, the second planet gears mesh with the second sun gear, in the second embodiment the second planet gears mesh with the second ring gear, all other features being identical.

The entry unit communicating with the summing gear train only via adjacent elements (first sun gear and first ring gear) of the summing gear train, the entry unit can be varied without modifying the summing gear train. In a basic embodiment, the input shaft from the combustion engine directly drives either the first sun gear via a first coupling or alternatively the first ring gear via a second coupling.

In a first development of the entry unit, a first brake is added for immobilizing the first ring gear. A break is also a coupling and therefore is encompassed by the term coupling in the claims. By actuating this brake and closing no other coupling, a slowest range is provided with torque transmission by the variator only. In this range, the summing gear train acts as a high-ratio reduction gear train.

In a more elaborate development, the entry unit comprises a basic planetary gear train acting as a step-up train that can be activated by a further brake on the input side of the entry unit. By this, a further range is created. In a preferred embodiment, this step-up train comprises a planet carrier drivingly connected with the input shaft from the combustion engine and carrying the planet gears, and a sun gear on a drive-through shaft between the couplings and comprises a ring gear which can be immobilized by a second brake on the input side. In this manner the step-up gear train and the second brake are integrated together with the other couplings in the entry unit, thus reducing bulk and expense.

BRIEF DESCRIPTION OF THE DRAWINGS

The invention will now be described and commented along with the following drawings, representing:

FIG. 4: A coupling table.

DETAILED DESCRIPTION

Figure 1:
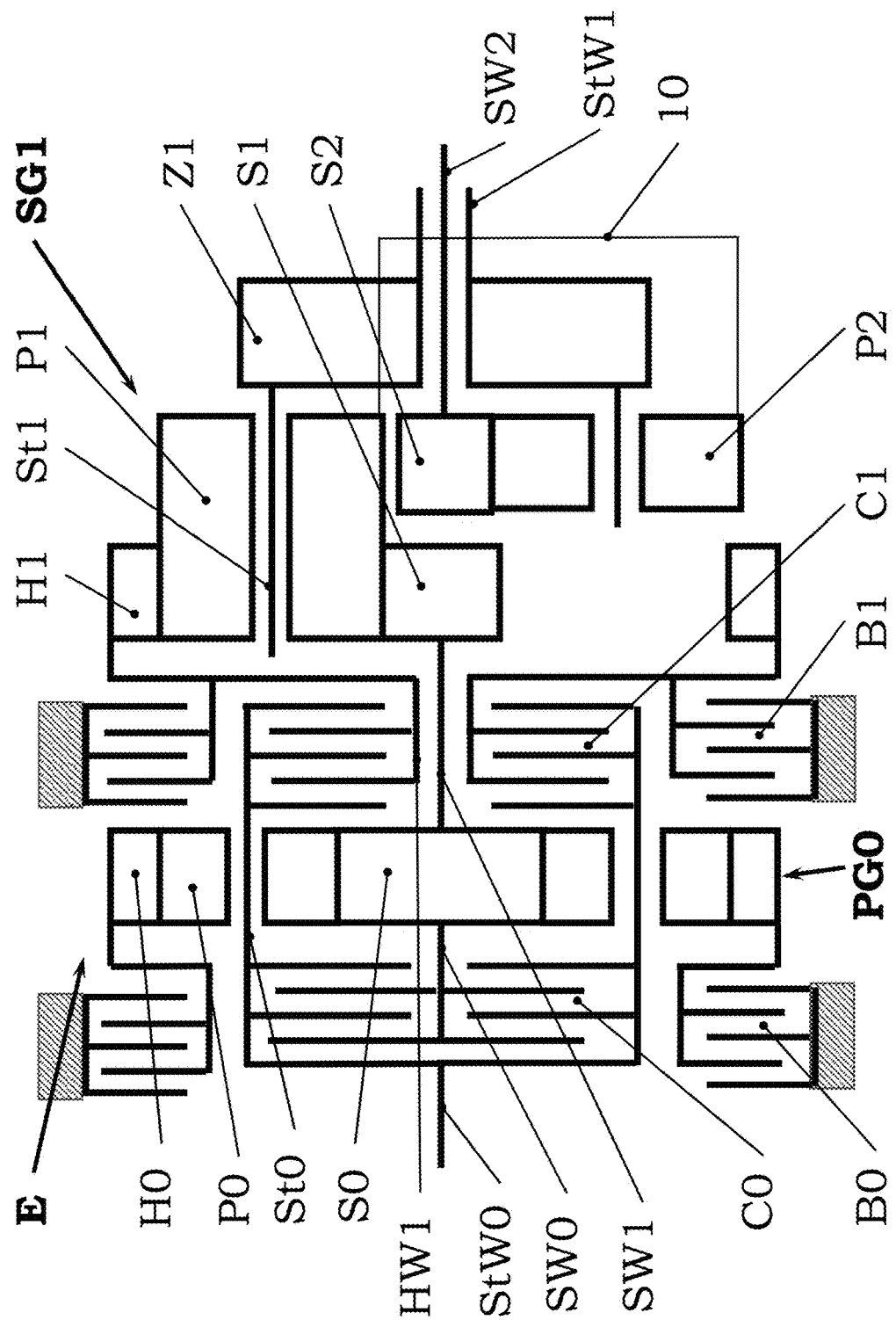
FIG. 1: A first embodiment in longitudinal section, simplified.
Figure 2:
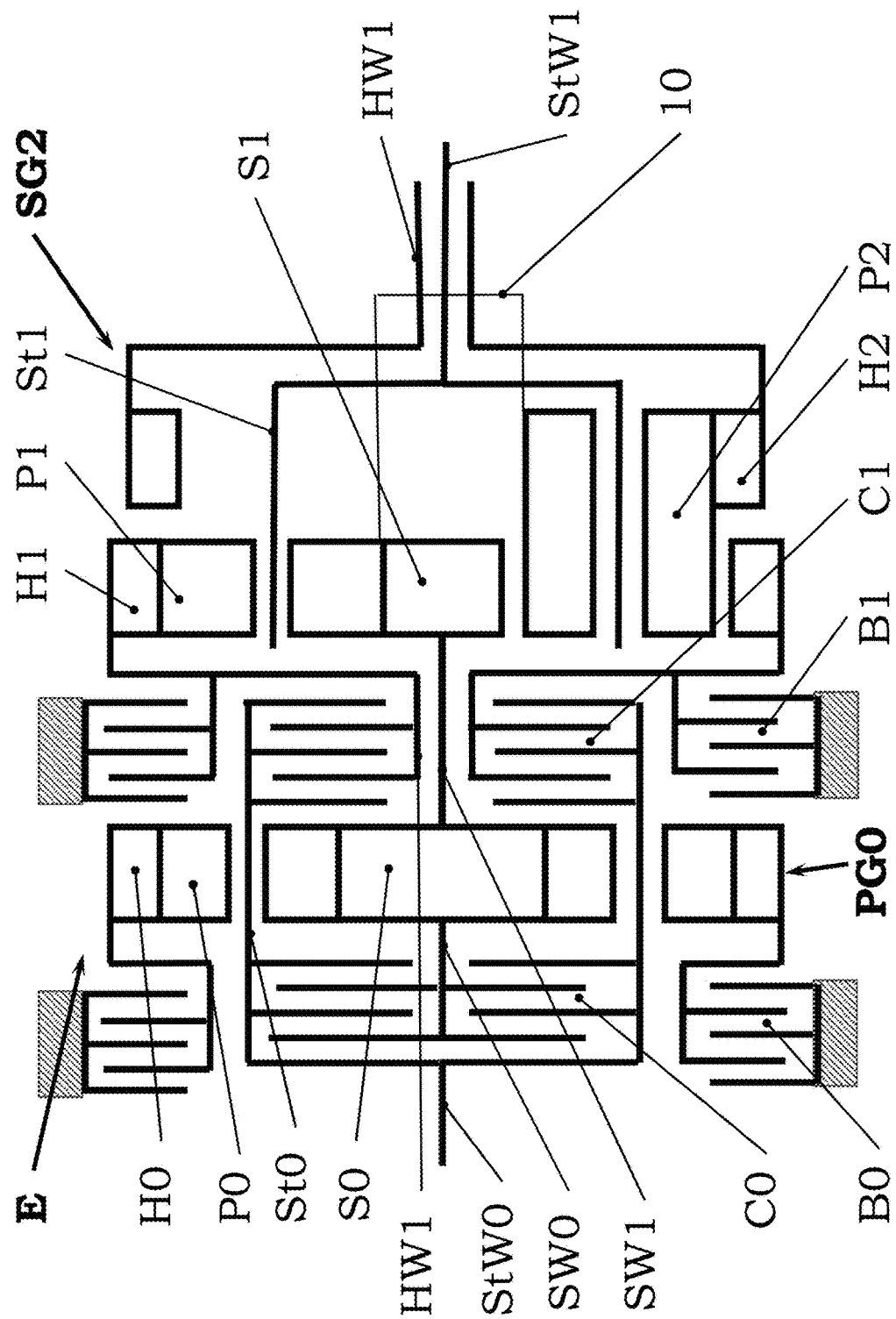
FIG. 2: A second embodiment in longitudinal section, simplified.

In FIGS. 1 and 2 the essential elements are referenced with suggestive acronyms, other elements with reference numbers. Casing, Variator and control are omitted for the sake of clarity. The acronyms stand for:

VM Combustion engine
SG Continuously variable power split transmission
E Entry unit
SG1 Summing gear train in a first embodiment
SG2 Summing gear train in a second embodiment
V Variator
PG0 Step-up planetary gear train, in entry unit E
H0 Ring gear, in entry unit E
H1 First ring gear
H2 Second ring gear in second embodiment
P0 Planetary gears in entry unit E
P1 First planetary gears
P2 Second planetary gears
S0 Sun gear in entry unit E
S1 First sun gear
S2 Second sun gear
St0 Planet carrier in entry unit E
St1 First Planet carrier
StW0 Input shaft from VM
StW1 Output shaft
SW0 Sun gear shaft in entry unit E, (drive-through shaft)
SW1 First sun gear shaft
SW2 Second sun gear shaft (central gear shaft in first embodiment)
HW1 First ring gear shaft
HW2 Second ring gear shaft (central gear shaft in second embodiment)
Z1 Output gear
B0 Brake in entry unit E
B1 First brake
C0 Coupling for connection with S1
C1 Coupling for connection with H1

In FIG. 1 the power path proceeds from left to right, from the combustion engine VM via entry shaft StW0 to the entry unit E which contains all couplings and brakes and, in this case, an entry side planetary gear train PG0. The input shaft StW0 forms at its end an entry unit planet carrier St0 which also contains the outer half of the coupling arrangements C0 and C1. The couplings here are clutches, even so they are operated in synchronous points, see below.

The inner half of the coupling arrangement C0 is coupled to the entry unit sun gear shaft SW0, which in the basic embodiment is also the first sun gear shaft SW1, terminating with the first sun gear S1 of the summing gear train SG1. In the embodiment shown in FIG. 1, the input side sun gear shaft SW0 is a through-drive shaft carrying the entry unit sun gear S0 of the entry unit planetary gear train PG0. This planetary gear train PG0 selectively operates as a step-up gear train. The entry unit sun gear S0 meshes with the entry unit planetary gears P0 journaled in the entry unit planet carrier St0. The entry unit planetary gears P0 in turn mesh with the entry side ring gear H0. This ring gear H0 can be locked with the casing (symbolized by hatched squares in FIG. 1) by means of the brake B0, thus immobilizing it.

The inner half of coupling C1 is located on the first ring gear shaft HW1 and rigidly united with the first ring gear H1 of the summing gear train SG1 (SG2 in FIG. 2). Depending on the selected range, the mechanical fraction of the torque transmitted is provided to the summing gear train SG1 either by way of the first ring gear shaft HW1 or by way of the first sun gear shaft S1 of the summing gear train SG1. In order to provide a purely hydrostatic or electric range, the ring gear shaft HW1 can be locked with the casing of the entry unit E by means of a brake B1. In this range, the summing gear train SG1 acts as a high-ratio reduction gear train. In this range the first sun gear S1 together with the sun gear shaft is idling.

The summing gear train SG1 is a planetary gear train with four shafts. The three entry shafts are the first sun gear shaft SW1 and the first ring gear shaft HW1 with ring gear H1 for the mechanically transmitted fraction of the torque, and the central gear shaft SW2 (In FIG. 1 the sun gear shaft with the sun gear S2) for the fraction of the torque from the Variator V. The output shaft StW1 here is a hollow shaft with the second sun gear shaft SW2 inside.

The arrangement of gears in the summing gear train SG1 is as follows: The first sun gear S1 meshes with the axially elongated first planetary gears P1 which in turn mesh with the first ring gear H1 and with the second planetary gears P2 journaled on the same first planet carrier St1. Both sets of planetary gears P1, P2 engaging each other is indicated in FIG. 1 by the lines 10. In this embodiment, the planet carrier St1 can be featured as the output gear Z1, unless the output power is exported by way of the output shaft StW1. This depends on the position of the whole transmission in a particular application.

The second embodiment depicted in FIG. 2 differs from FIG. 1 in that as a second central wheel, there is a second ring gear H2 instead of the second sun gear S2 of FIG. 1. In this way, the second planetary gears P2 are in meshing engagement with the first planetary gears P1 (indicated by the lines 10) and with the second ring gear H2 rigidly coupled with the second ring gear shaft HW1. Due to the driving connection between both ring gears H1, H2, the second planetary gears P2 are wider (=axially elongated) than the first planetary gears P1. The first planetary gears P1 are—as in FIG. 1—in meshing engagement with the first sun gear S1 and the first ring gear H1. In this embodiment, the second ring gear shaft HW1 is a hollow shaft and the output shaft StW1 is a plain shaft providing for easy drive-through through the entire transmission.

Figure 3:
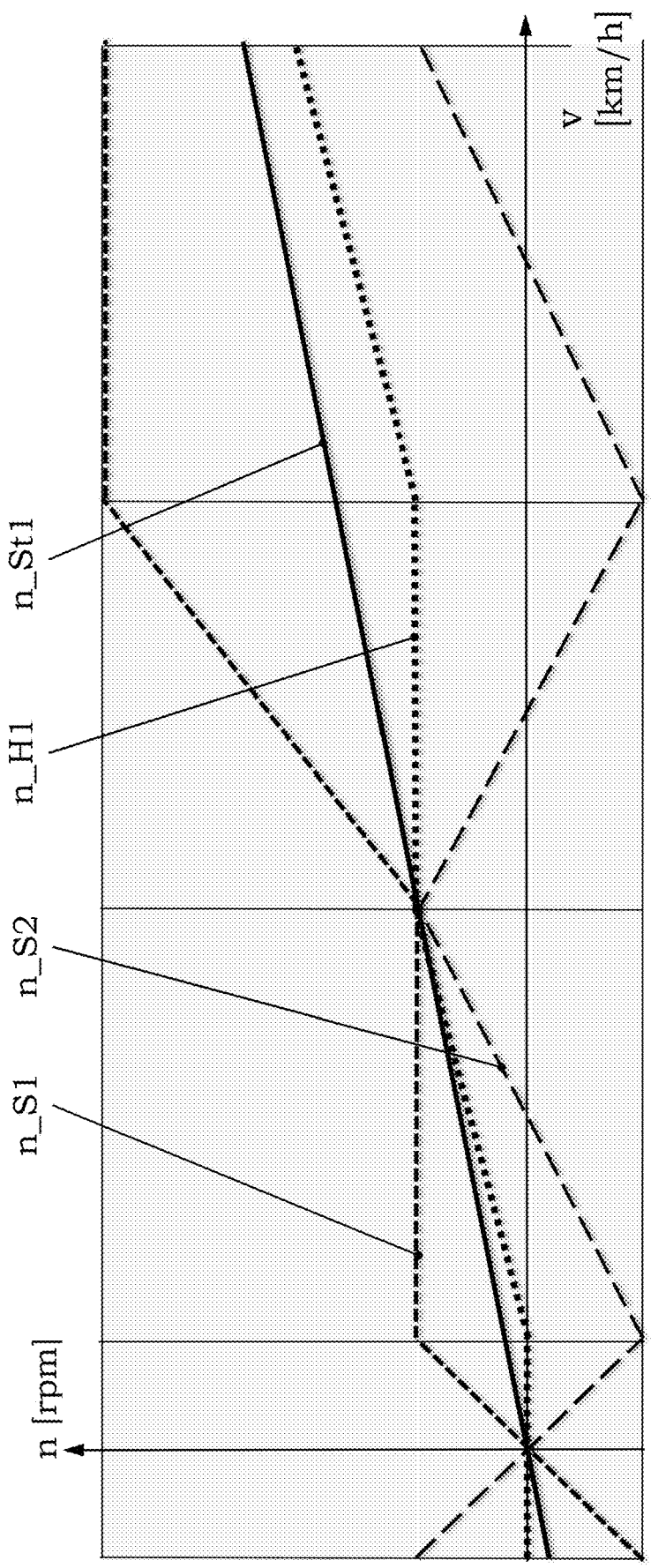
FIG. 3: A rotating speed diagram for the first embodiment.

The mode of operation of the transmission of FIG. 1 will now be described in reference to FIG. 3. In the rotating speed diagram, the abscissa axis represents the speed of the vehicle (which is proportional with the rpm of the first planet carrier St1), and the vertical ordinate axis represents the rotating speed of various elements depending on the speed of the vehicle. These are:

The speed of the second sun gear S2, driven by the variator with a speed n_S2 in dashed line (long dashes), The speed of the first sun gear S1 driven by the combustion engine VM with a speed n_S1 in dashed line (short dashes), The speed of the first ring gear H1 with a speed n_H1 in dotted line, The speed of the planet carrier St1 as exit speed n_St1 in through line.

The forward ranges are referred to with F1 through F4, the slow reverse range with FR. The points of transition are referred to as 0 (travelling speed zero, transition from forward to reverse), as 1 (transition from F1 to F2), as 2 (transition from F2 to F3) and with 3 (transition from F3 to F4).

Figure 4:
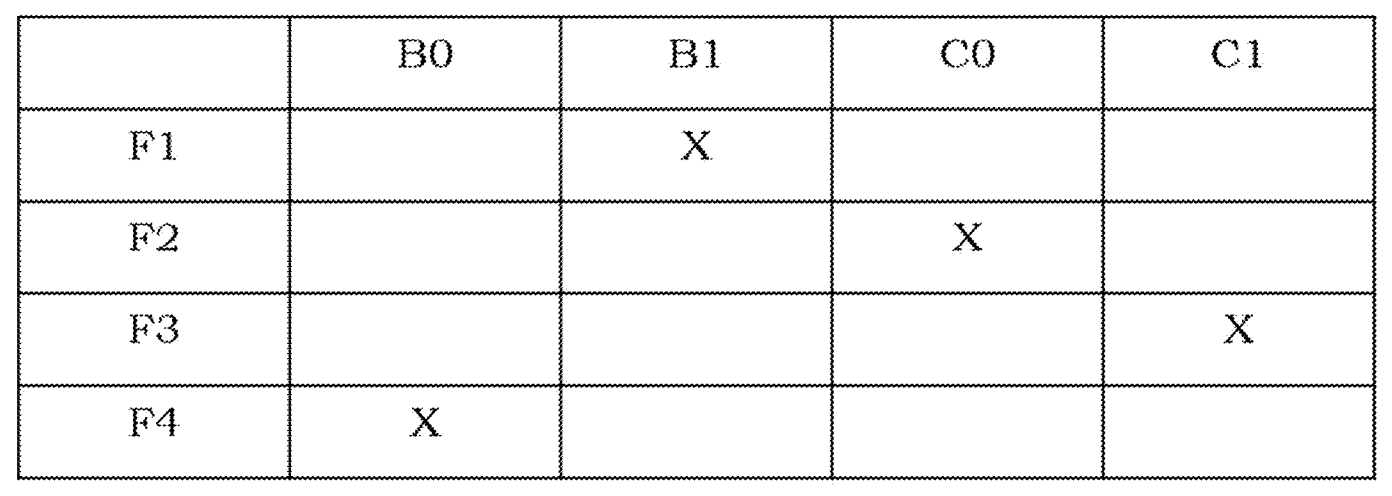

In the reverse range FR and in the first forward range F1, according to the table in FIG. 4, the brake B1 is closed, the first ring gear H1 thus immobilized (n_H1=0). Variator V drives the planet carrier St1 and therewith the output StW1 by way of the second gear shaft SW2, the second sun gear S2, and the first and second planetary gears P2, P1. The first sun gear S1 is idling (couplings C1 and C2 being disengaged) at the same rpm as the second sun gear S2, but in opposite sense. In this slow range, the vehicle is driven by the variator V alone. Reversing is achieved simply by reversing the sense of rotation of the variator.

The second range F2 is engaged in the point of transition 1, the variator V and the sun gear S1 having reached the maximum rotating speed in range F1, by closing coupling C1 and opening the brake B1. The rotating speed of the combustion engine VM is constant and equals the speed n_S1 of the first sun gear S1. Thus, the transition proceeds synchronously without slip in coupling C0 and brake B1. The output speed n_S2 of variator V now is reduced, crosses the line n=0 and picks up again in the opposite sense of rotation until the next point of transition 2 is reached. This point of transition 2 is a further point of synchronism, wherein the rotating speeds n_S1 and n_H1 are equal. In this range, the speed of the first sun gear S1 (and therewith the speed of the combustion engine VM) is constant.

The third range F3 is engaged in point 3 by opening coupling C0 and simultaneously closing coupling C1, again both couplings do not slip in this point of synchronism. By this, the fraction of the torque of the combustion engine VM moves from the first sun gear S1 to the first ring gear H1, which now rotates with a speed of n_H1. At the same time the speed n_S2 of the variator V and therewith of the second sun gear S2 starts to drop until it reaches its maximum in the opposite sense of rotation. In this range, the first sun gear S1 idles with a speed of n_S1.

The fourth range F4 is engaged in the synchronous transition point 3 by opening coupling C1 and closing the brake B0. The speed of the variator V and therewith the speed n_S2 of the sun gear S2 now starts dropping again. By actuating the brake B0, the entry side planetary gear train PG0 now acts as a step-up gear train. Its step-up ratio is chosen so that the first sun gear S1 idling with the speed n_S1 in the third range has reached the speed corresponding to the speed of the combustion engine VM in the point of transition 4. In this synchronous point of transition also, coupling C1 and brake B0 are switched without slip. In this fourth range, the speed of the variator is again varied from a maximum in one sense of rotation to the maximum in the opposite sense.

In this way a continuously variable power split transmission with four forward ranges and one reverse range with a synchronous transition throughout is achieved with less expenditure and a better functionality.

The invention claimed is:

1. Continuously variable power split transmission for powering vehicles and/or work machines by a combustion engine (VM), including a variator (V), a summing gear train and a number of couplings, the variator delivering a fraction of the power of the combustion engine with a speed that is continuously variably controlled between maximum speeds in both directions to the summing gear train, where it is added to the other fraction of the power, and where the transition between a plurality of ranges occurs in points of synchronism, the summing gear train being a planetary gear train with four shafts including a first sun gear (S1), a second sun gear (S2), a first ring gear (H1) and a number of planetary gears (P1, P2) journaled on a planet carrier (St1), wherein:
   a. the couplings (C0, C1; C0, C1, B0, B1) are incorporated in one common entry unit (E), which is arranged in the flux of power between the combustion engine (VM) and the summing gear train (SG1),
   b. the summing gear train (SG1) includes first planetary gears (P1) and second planetary gears (P2) journaled on a common planet carrier (St1), the first (P1) and the second planetary gears (P2) meshing with each other,
   c. the first sun gear (S1) or the first ring gear (H1) are driven by the combustion engine (VM) and the second sun gear (S2) is driven by the variator (V), the first sun gear (S1) or the first ring gear (H1)—for the transition from one range to the next range in a point of synchronism (1,2,3)—being in turn drivingly connected with the combustion engine (VM)
   d. The planet carrier (St1) is drivingly connected with the output shaft (StW1) of the transmission.

2. Continuously variable power split transmission according to claim 1, wherein the planet carrier (St1) includes or features an output gear (Z1).

3. Continuously variable power split transmission according to claim 1, wherein the first ring gear (H1) of the summing gear train (SG1) is disposed adjacent the entry unit (E) and the first planet carrier (St1) is disposed on the other side of the summing gear train (SG1), and wherein the first sun gear (S1) is disposed adjacent the entry unit (E) and the second sun gear (S2) is disposed on the other side of the summing gear train (SG1), and wherein the planet carrier (St1) is the power output element, rotating with the summed up continuously variable speed (n_StW1).

4. Continuously variable power split transmission according to claim 1, wherein the first sun gear (S1) of the summing gear train (SG1) meshes with the first planetary gears (P1), the second sun gear (S2) meshes with the second planetary gears (P2), the second planetary gears (P2) mesh with the first planetary gears (P1), and the first planetary gears (P1) mesh with the first ring gear (H1).

5. Continuously variable power split transmission according to claim 1, wherein the entry unit (E) is drivingly connected with the combustion engine (VM) via an input shaft (StW0) and includes a first coupling (C0) and a second coupling (C1), wherein the first coupling (C0) if closed establishes the connection between the input shaft (StW0) and a sun gear shaft (SW1) ending in the sun gear (S1), and wherein the second coupling (C1) if closed drivingly connects the input shaft (StW0) with the first ring gear shaft (HW1).

6. Continuously variable power split transmission according to claim 5, wherein the entry unit (E) comprises a first brake (B1) for immobilizing the first ring gear (H1) in order to access a range where only the variator transmits power.

7. Continuously variable power split transmission according to claim 5, wherein the entry unit (E) comprises a step-up planetary gear train (PG0), activated by actuating the entry-side brake (B0).

8. Continuously variable power split transmission according to claim 7, wherein the step-up gear train (PG0) includes: an entry unit planet carrier (St0) drivingly connected with the input shaft (StW0) with entry unit planetary gears (P0), an entry unit sun gear (S0) fixed on the sun gear shaft (SW0, SW1) between the couplings (C0, C1), and an entry unit ring gear (H0) which can be immobilized by actuating the entry side brake (B0).

9. Continuously variable power split transmission for powering vehicles and/or work machines by a combustion engine (VM), including a variator (V), a summing gear train and a number of couplings, the variator delivering a fraction of the power of the combustion engine with a speed that is continuously variably controlled between maximum speeds in both directions to the summing gear train, where it is added to the other fraction of the power, and where the transition between a plurality of ranges occurs in points of synchronism, the summing gear train being a planetary gear train with four shafts including a first sun gear (S1), a second ring gear (H2), a first ring gear (H1) and a number of planetary gears (P1, P2) journaled on a planet carrier (St1), wherein:
  a. the couplings (C0, C1; C0, C1, B0, B1) are incorporated in one common entry unit (E), which is arranged in the flux of power between the combustion engine (VM) and the summing gear train (SG2),
  b. the summing gear train (SG2) includes first planetary gears (P1) and second planetary gears (P2) journaled on a common planet carrier (St1), the first (P1) and the second planetary gears (P2) meshing with each other,
  c. the first sun gear (S1) or the first ring gear (H1) are driven by the combustion engine (VM) and the second ring gear (H2) is driven by the variator (V), the first sun gear (S1) or the first ring gear (H1)—for the transition from one range to the next range in a point of synchronism (1,2,3)—being in turn drivingly connected with the combustion engine (VM)
  d. the planet carrier (St1) is drivingly connected with the output shaft (StW1) of the transmission.

10. Continuously variable power split transmission according to claim 9, wherein the first ring gear (H1) is disposed adjacent the entry unit (E) and the planet carrier (St1) is disposed on the other side of the summing gear train (SG2), and wherein the first sun gear (S1) is disposed adjacent the entry unit (E) and the second ring gear (H2) is disposed on the other side of the summing gear train (SG2), and wherein the planet carrier (St1) is the power output element, rotating with the summed up continuously variable speed (n_StW1).

11. Continuously variable power split transmission according to claim 9, wherein the first sun gear (S1) meshes with the first planetary gears (P1), the first ring gear (H1) meshes with the first planetary gears (P1), the first planetary gears (P1) mesh with the second planetary gears (P2) and the second planetary gear (P2) meshes with the second ring gear (H2).

12. Continuously variable power split transmission according to claim 9, wherein the entry unit (E) is drivingly connected with the combustion engine (VM) via an input shaft (StW0) and includes a first coupling (C0) and a second coupling (C1), wherein the first coupling (C0) if closed establishes the connection between the input shaft (StW0) and a sun gear shaft (SW1) ending in the sun gear (S1), and wherein the second coupling (C1) if closed drivingly connects the input shaft (StW0) with the first ring gear shaft (HW1).

13. Continuously variable power split transmission according to claim 12, wherein the entry unit (E) comprises a first brake (B1) for immobilizing the first ring gear (H1) in order to access a range where only the variator transmits power.

14. Continuously variable power split transmission according to claim 12, wherein the entry unit (E) comprises a step-up planetary gear train (PG0), activated by actuating the entry-side brake (B0).

15. Continuously variable power split transmission according to claim 14, wherein the step-up gear train (PG0) includes: an entry unit planet carrier (St0) drivingly connected with the input shaft (StW0) with entry unit planetary gears (P0), an entry unit sun gear (S0) fixed on the sun gear shaft (SW0, SW1) between the couplings (C0, C1), and an entry unit ring gear (H0) which can be immobilized by actuating the entry side brake (B0).

* * * * *